March 2, 1965     L. PÉRAS     3,171,156
ARTICULATION FOR THE BONNET OF AN AUTOMOBILE
Filed March 29, 1962     4 Sheets-Sheet 1
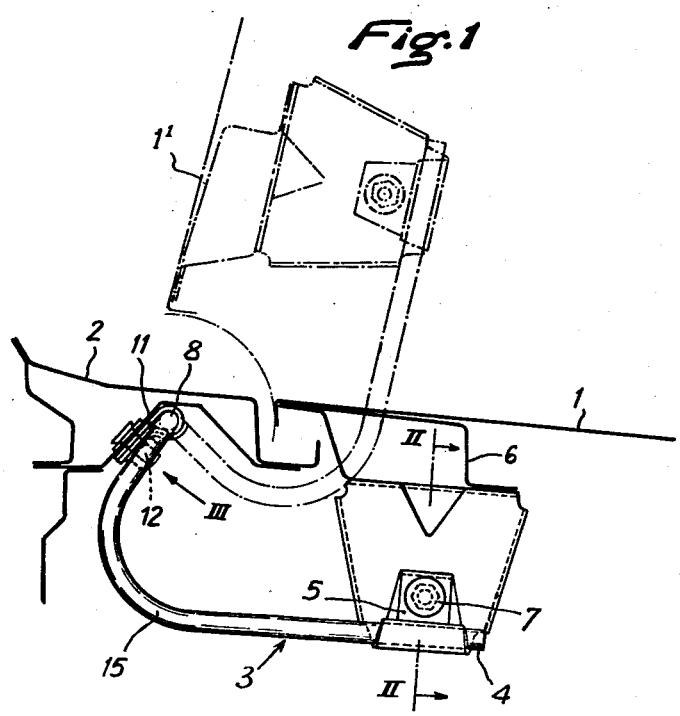
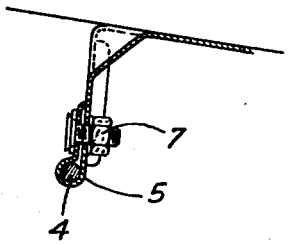
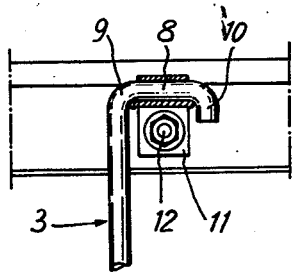
Inventor
Lucien Péras
By Stevens, Davis, Miller & Mosher
Attorneys March 2, 1965 L. PÉRAS 3,171,156
ARTICULATION FOR THE BONNET OF AN AUTOMOBILE
Filed March 29, 1962 4 Sheets-Sheet 2
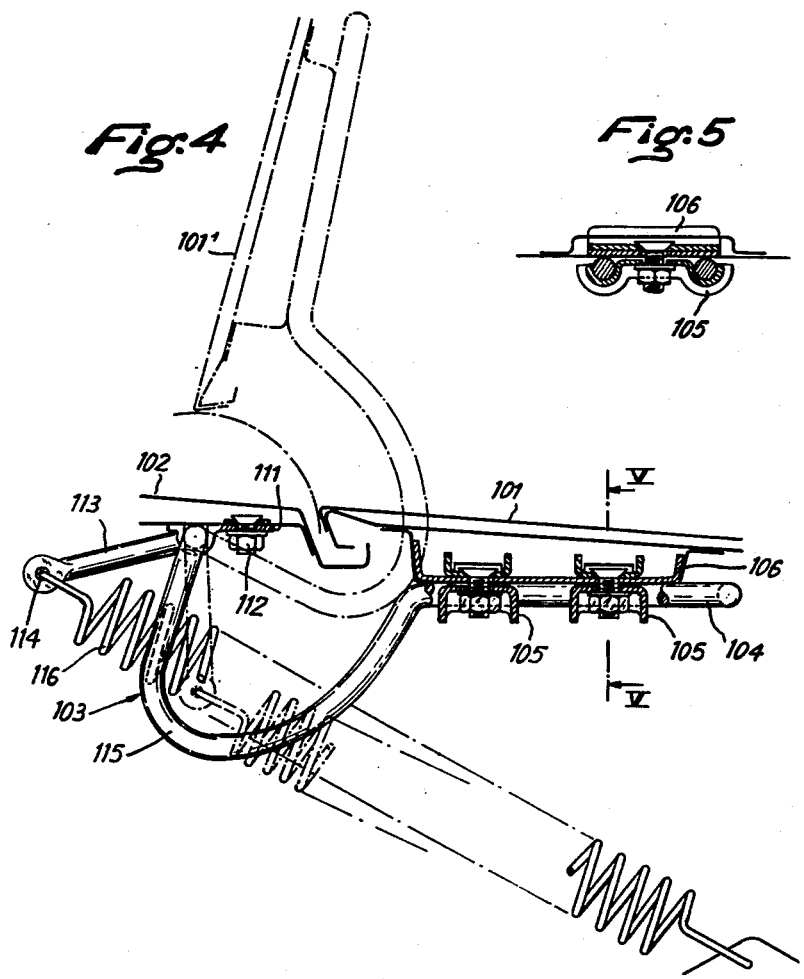
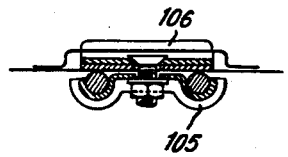
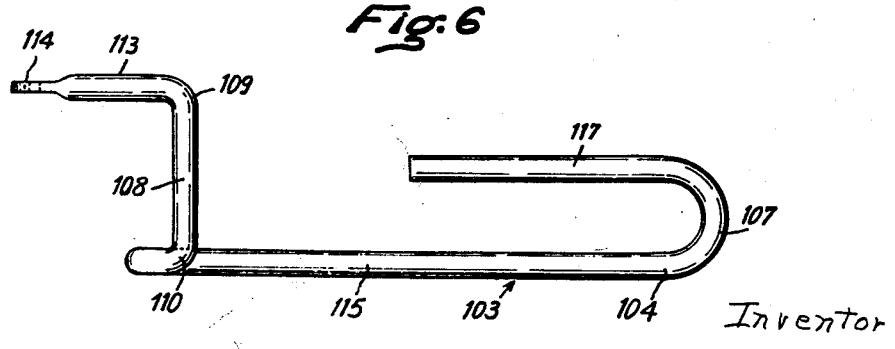
Inventor
Lucien Péras
By Stevens, Davis, Miller & Mosher
Attorneys March 2, 1965 L. PÉRAS 3,171,156
ARTICULATION FOR THE BONNET OF AN AUTOMOBILE
Filed March 29, 1962 4 Sheets-Sheet 3
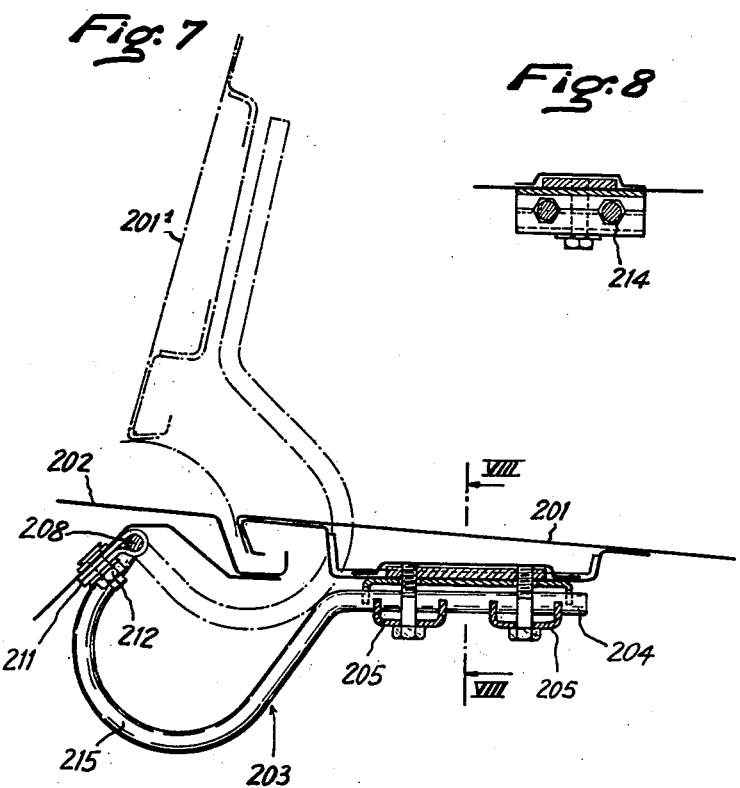
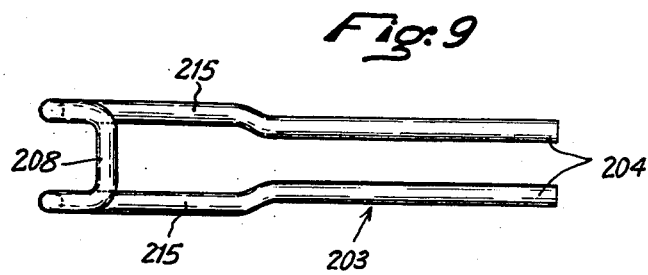
Inventor
Lucien Péras
By Stevens Davis Miller & Mosher
Attorneys March 2, 1965 L. PÉRAS 3,171,156
ARTICULATION FOR THE BONNET OF AN AUTOMOBILE
Filed March 29, 1962 4 Sheets-Sheet 4
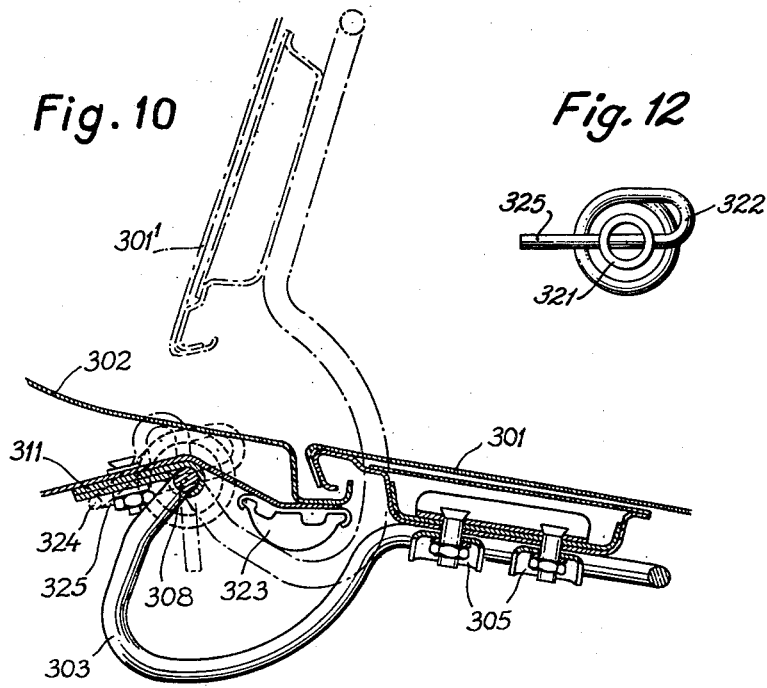
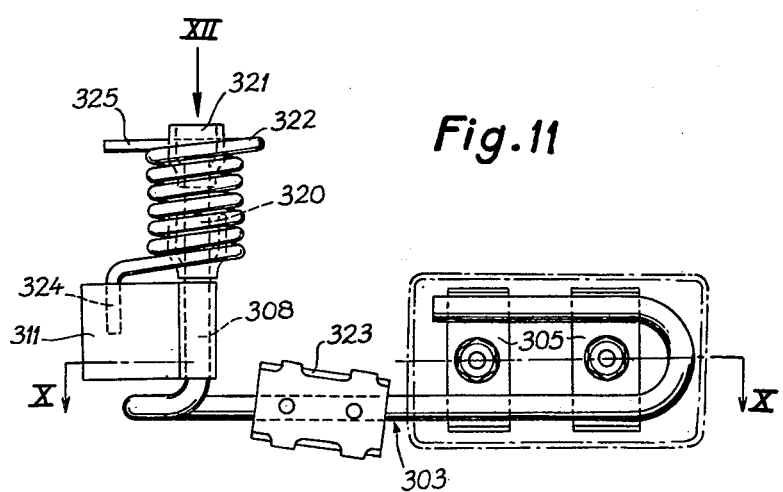
Inventor
Lucien Péras
By Stevens, Davis, Miller & Mosher
Attorneys

United States Patent Office 3,171,156
Patented Mar. 2, 1965

3,171,156
ARTICULATION FOR THE BONNET OF AN AUTOMOBILE
Lucien Péras, Billancourt, France, assignor to Regie Nationale des Usines Renault, Billancourt, France
Filed Mar. 29, 1962, Ser. No. 183,624
Claims priority, application France, Apr. 5, 1961, 857,790; Mar. 13, 1962, 890,942
5 Claims. (Cl. 16—135)

A hinge for the bonnet of an automobile must comply with requirements which are at the same time functional (safety, small space requirement in the closed position of the bonnet), aesthetic and economic.

To this end, the present invention has for its object a bonnet hinge constituted essentially by a rod having, in one plane, a straight portion gripped in a first stirrup rigidly fixed to the bonnet and a swan-neck portion, the latter being extended by a straight portion perpendicular to the previously-mentioned plane and pivoting in a second stirrup rigidly fixed to the body. The two stirrups referred to above are located under the bonnet and under the chassis, so that the articulation is invisible. The first stirrup is clamped at an adjustable distance on the straight portion of the rod, which enables the distance between the bonnet and the chassis to be adjusted in turn.

The rod may be single of double: in the latter case, it has two identical swan-neck portions coupled to a single central straight portion which pivots. As an alternative construction of its single form, the rod may also have its portion which is fixed to the bonnet doubled by folding back to the shape of a hairpin.

A rubber stop may be provided in order to stop the swan neck in the open position, together with a spring for counter-balancing the bonnet.

For those of the said articulations which have a single swan-neck portion, this balancing spring may be easily mounted as a tension spring; it is however more in keeping with the spirit of the invention, directed towards minimum space requirements, to utilize a torsion spring wound round a straight extension of the pivotal straight portion of the rod, this spring being fixed on the one hand to the flange-bearing fixed to the body, and on the other hand inside a cup welded to the said straight extension.

In all case, an articulation of this kind is aesthetic (due to its invisibility and its possibility of adjustment of the distance between bonnet and chassis), has a very small overall size in the closed portion, and is economical because of it great simplicity.

The invention will however be better understood from the description which follows below, by way of example only and not in any limitative sense, of two of its forms of embodiment, reference being made to the accompanying drawings, in which:

FIG. 1 is a longitudinal section of a bonnet hinge in accordance with a first form of embodiment of the invention.

FIG. 2 is a cross-section taken along the line II—II of FIG. 1.

FIG. 3 is a view along the line of the arrow III of FIG. 1.

FIG. 4 is a longitudinal section of a bonnet hinge, in accordance with a second form of embodiment of the invention.

FIG. 5 is a cross-section of the previous embodiment taken along the line V—V of FIG 4.

FIG. 6 is a view from above the pivotal rod only of this second form of the invention.

FIG. 7 is a longitudinal section of a bonnet hinge according to a third form of embodiment of the invention.

FIG. 8 is a cross-section along the line VIII—VIII of FIG. 7.

FIG. 9 is a view from above the pivotal rod only of this third form of the invention.

FIG. 10 is a vertical section of a fourth form of embodiment of the invention, utilizing a balancing spring working in torsion.

FIG. 11 is a view of this latter form looking from above.

FIG. 12 is a view along the arrow XII of FIG. 11.

As shown in FIGS. 1, 2 and 3, relating to the first form of the invention, the bonnet of an automobile being shown closed at 1 and open at 1', the portion of the body to which it is pivoted being shown at 2, the articulation is composed of a rod 3 having a portion 15 bent to a swan-neck, extended on one side by a straight portion 4 which is fixed in an adjustable manner in the supporting stirrup 5, the latter being attached in turn to the cross-member 6 of the bonnet. The bolt 7 enables the stirrup 5 to be fixed at any given position on the portion 4 of the rod.

The extremity of the rod 3 which is opposite to 4 is bent twice at right angles at 9 and 10 (FIG. 3), and its straight portion 8, located between 9 and 10, pivots inside a stirrup 11 fixed to the body of the vehicle by a bolt 12.

According to the second form of embodiment of the invention shown in FIGS. 4, 5 and 6, the pivotal rod 103 again comprises a portion 115 bent to a swan-neck, and a straight portion 104. This latter portion is however doubled at 117 by an elbow 107 to a hairpin shape. In addition, the straight pivoting portion 108 is extended beyond the elbow 109 by a lever 113 terminating in an eyelet 114, in which is anchored a spring 116 for counter-balancing the bonnet.

The shaft 108 rotates in a hinge 111 fixed to the body 102 of the vehicle by bolts 112. The doubled straight portion 104–117 is fixed to a cross-member 106 of the bonnet by means of two adjustable stirrups 105.

In accordance with the third form of embodiment of the invention shown in FIGS. 7, 8 and 9, the pivotal rod 203 is composed of two arms each having a straight portion 204 and a swan-neck portion 215, these two arms being coupled to the straight central portion 208 pivoting in the stirrup 211 which is fixed to body 202.

The straight portions 204 are fixed in two adjustable stirrups 205 each gripping the two arms 204 by means of trapezoidal grooves (see FIG. 8).

The articulation of the body 202 to the bonnet 201 is thus again in this case similar to those previously described, but the doubling of the rod increases its strength and reduces its overall size.

In accordance with a fourth form of embodiment of the invention shown in FIGS. 10 and 11, the rod 303 is attached to the bonnet 301 by collars 305 and to the body 302 by a bearing 311, in which pivots its straight portion 308 extended by a portion 320, to which is welded a cup 321. A coil spring 322, employed in torsion, is anchored on the one hand inside the cup 321 by its portion 325, and on the other hand to the bearing 311 by its portion 324.

This arrangement offers the advantage of small space requirements for the spring.

A rubber stop 323, fixed to the case by known means, damps the shock at the end-of-travel of the swan-neck against the body, in the fully-open position of the bonnet.

The addition of a rubber stop may furthermore be extended to the forms of the invention previously described.

I claim:

1. A bonnet hinge for an automobile, comprising in combination: a one-piece resilient rod having a straight mounting portion, an intermediate swan-neck portion in the vertical plane, and a straight bearing portion at right angles to said mounting portion and to the plane of said swan-neck portion; anchoring means for adjustably securing said mounting portion of said rod to the bonnet at a distance from the edge of the bonnet; and a journalled bearing means, attached to the body of the automobile at a distance from the edge of the body, for receiving said bearing portion of said rod for rotative movement therein.

2. The combination of claim 1, wherein said rod consists of two substantially identical parallel branches, each branch having said mounting and said swan-neck portions, and being joined together by said bearing portion; and said anchoring means being adjustable longitudinally along said mounting portion.

3. The combination in accordance with claim 1, wherein said mounting portion comprises first and second straight sections and an elbow section, said first and second straight sections being mutually parallel and joined by said elbow section.

4. The combination of claim 3, including a counter-balancing torsion spring and an anchoring member terminating said bearing portion, for anchoring one end of said spring; and said bearing means anchoring the other end of said spring.

5. The combination of claim 3, including a lever extending from said bearing portion and terminating said rod; and a counter-balancing tension spring, one end of which is secured to the end of said lever and the other end of which is secured to the automobile.

References Cited by the Examiner
UNITED STATES PATENTS

| | | | |
|---|---|---|---|
| 1,106,053 | 8/14 | Nichols. | |
| 1,312,945 | 8/19 | Bellow | 16—192 X |
| 1,851,973 | 4/32 | Brandt | 287—118 X |
| 2,153,734 | 4/39 | Westrope | 16—135 |
| 2,183,210 | 12/39 | Anderson | 16—189 |
| 2,201,490 | 5/40 | Howe | 16—135 |
| 2,646,106 | 7/53 | Terry | 16—192 X |
| 2,703,254 | 3/55 | Shackey | 16—192 X |
| 2,892,209 | 6/59 | Condit | 16—135 X |
| 2,894,278 | 7/59 | Gessler | 16—135 X |
| 3,019,282 | 1/62 | Husted. | |
| 3,026,497 | 3/62 | Myers et al. | 339—246 |
| 3,069,720 | 12/62 | Gessier | 16—128.1 |

M. HENSON WOOD, JR., *Primary Examiner.*

DONLEY J. STOCKING, *Examiner.*